(12) United States Patent
Jebutu

(10) Patent No.: US 7,839,144 B2
(45) Date of Patent: Nov. 23, 2010

(54) METHOD FOR ESTIMATING INSITU FLUID VISCOSITY FROM NMR MEASUREMENTS

(75) Inventor: Segun A. Jebutu, Richmond, TX (US)

(73) Assignee: Baker Hughes Incorporated, Houston, TX (US)

( * ) Notice: Subject to any disclaimer, the term of this patent is extended or adjusted under 35 U.S.C. 154(b) by 170 days.

(21) Appl. No.: 12/024,249

(22) Filed: Feb. 1, 2008

(65) Prior Publication Data

US 2009/0195246 A1 Aug. 6, 2009

(51) Int. Cl.
    *G01V 3/00* (2006.01)
(52) U.S. Cl. .................. 324/303; 324/306; 324/318
(58) Field of Classification Search ......... 324/300–322; 600/407–435; 382/128–131
    See application file for complete search history.

(56) References Cited

U.S. PATENT DOCUMENTS

| | | | | |
|---|---|---|---|---|
| 5,146,924 | A * | 9/1992 | Sepponen | 600/410 |
| 5,211,166 | A * | 5/1993 | Sepponen | 600/420 |
| 5,218,964 | A * | 6/1993 | Sepponen | 600/414 |
| 7,053,611 | B2 * | 5/2006 | Freedman | 324/303 |
| 2005/0270023 | A1 * | 12/2005 | Freedman | 324/303 |
| 2009/0195246 | A1 * | 8/2009 | Jebutu | 324/303 |

OTHER PUBLICATIONS

T.K. Ogun, "Reservoir Development Optimisation Utilizing Nuclear Magnetic Resonance Technology". SPE 57860. Aug. 4-6, 1999. pp. 1-9.
B. Terry, et al. "Profiling the Wall-Cake Characterisitc of the Wellbore for Optimal Comparison of Logging-While-Drilling and Wireline-Bulk-Density Measurements". SPE 96633. Oct. 9-12, 2005. pp. 1-7.
W.J. Looyestijn. "Distinguishing Fluid Properties and Proucibility for NMR Logs". Proceedings of the 6th Nordic Symposium on Petrophysics, May 15-16, 2001, Trondheim, Norway. pp. 1-9.

* cited by examiner

*Primary Examiner*—Brij B. Shrivastav
*Assistant Examiner*—Tiffany A Fetzner
(74) *Attorney, Agent, or Firm*—Cantor Colburn LLP

(57) ABSTRACT

A method for estimating a viscosity of a fluid in a rock formation, the method including: performing a first nuclear magnetic resonance (NMR) measurement with zero magnetic field gradient on at least a portion of a sample of the rock formation to obtain a first distribution of transverse relaxation time constants; estimating a first diffusive couple factor from the first distribution; replacing the fluid of the at least a portion of the sample with another fluid; performing a second NMR measurement with zero magnetic field gradient on the at least a portion of the sample containing the another fluid to obtain a second distribution of transverse relaxation time constants; estimating a second diffusive couple factor from the second distribution; and estimating the viscosity of the fluid using the first diffusive couple factor and the second diffusive couple factor.

19 Claims, 9 Drawing Sheets

METHOD FOR ESTIMATING INSITU FLUID VISCOSITY FROM NMR MEASUREMENTS

BACKGROUND OF THE INVENTION

1. Field of the Invention

This invention relates to assessments of formation fluids, and in particular to determination of viscosity by use of nuclear magnetic resonance.

2. Description of the Related Art

Downhole characterization techniques are of considerable value for geophysical exploration. For example, characterization of parameters associated with formation fluids provides for insight into quality of the fluid. More specifically, knowledge of viscosity, $\sqrt{}$, can provide insight into the quality of hydrocarbons in a formation. A number of technologies are applied to determine the parameters. These technologies include nuclear magnetic resonance (NMR) imaging. Unfortunately, in the prior art, reliable use of NMR for determining viscosity, $\sqrt{}$, has not been realized.

Therefore, what are needed are techniques for estimating viscosity, $\sqrt{}$, of downhole fluids by use of NMR technologies.

BRIEF SUMMARY OF THE INVENTION

Disclosed is one example of a method for estimating a viscosity of a fluid in a rock formation, the method including: performing a first nuclear magnetic resonance (NMR) measurement with zero magnetic field gradient on at least a portion of a sample of the rock formation to obtain a first distribution of transverse relaxation time constants; estimating a first diffusive couple factor from the first distribution; replacing the fluid of the at least a portion of the sample with another fluid; performing a second NMR measurement with zero magnetic field gradient on the at least a portion of the sample containing the another fluid to obtain a second distribution of transverse relaxation time constants; estimating a second diffusive couple factor from the second distribution; and estimating the viscosity of the fluid using the first diffusive couple factor and the second diffusive couple factor.

Also disclosed is an embodiment of an apparatus for estimating a viscosity of a fluid in a rock formation, the apparatus including an electronics unit for: estimating a first diffusive couple factor from a first distribution of transverse relaxation time constants obtained from the at least one sample containing the fluid; estimating a second diffusive couple factor from a second distribution of transverse relaxation time constants obtained from the at least one sample with the fluid replaced by another fluid; and estimating the viscosity of the fluid using the first diffusive couple factor and the second diffusive couple factor; wherein the first distribution and the second distribution are obtained using a zero magnetic field gradient.

Further disclosed is an embodiment of a computer program product including machine readable instructions stored on machine readable media for estimating a viscosity of a fluid in a rock formation, the product having machine executable instructions for: determining a first diffusive couple factor from a first distribution of transverse relaxation time constants obtained from at least one sample of the rock formation, the first distribution obtained using a zero magnetic field gradient; determining a second distribution diffusive couple factor from a second distribution of transverse relaxation time constants obtained from the at least one sample with the fluid replaced by another fluid, the second distribution obtained using a zero magnetic field gradient; estimating the viscosity of the fluid using the first diffusive couple factor and the second diffusive couple factor; and at least one of recording the viscosity and displaying the viscosity to a user.

BRIEF DESCRIPTION OF THE DRAWINGS

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings, wherein like elements are numbered alike, in which:

DETAILED DESCRIPTION OF THE INVENTION

Figure 1A:
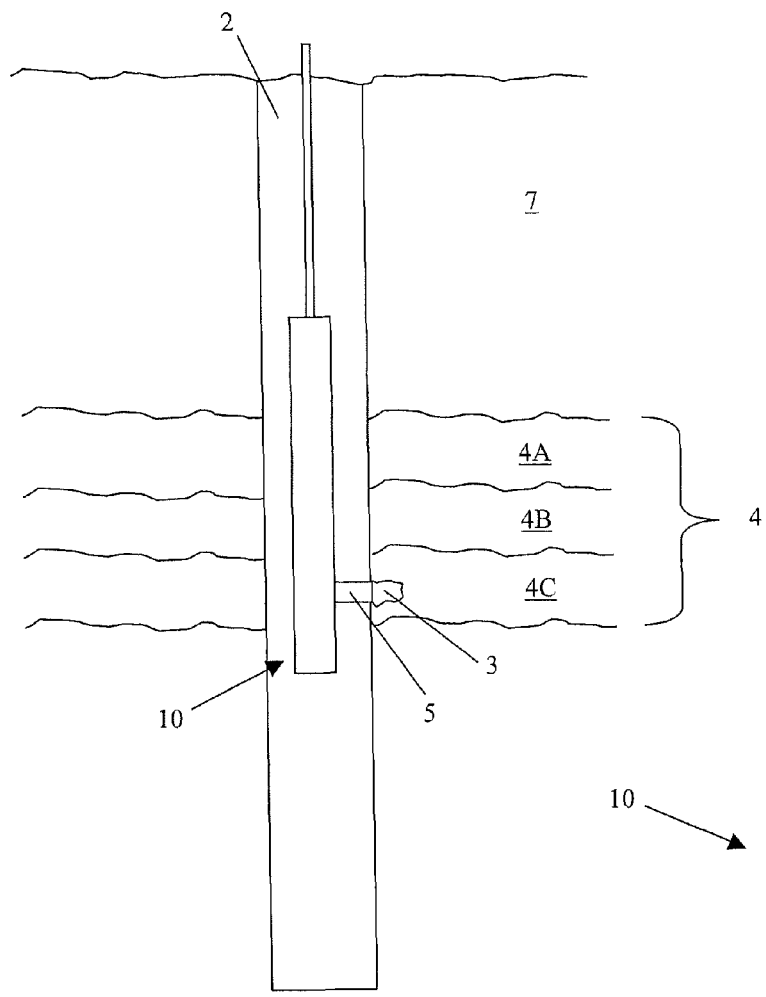
FIGS. 1A and 1B, collectively referred to as FIG. 1, illustrate an exemplary embodiment of a downhole tool in a borehole penetrating the earth.

Disclosed are exemplary techniques for determining a viscosity, $\sqrt{}$, of a fluid in a geologic formation. The techniques use nuclear magnetic resonance (NMR) measurements to determine the viscosity. A diffusive couple term related to a bulk relaxation component is introduced that is used to correlate a transverse relaxation time constant distribution to the viscosity.

In one embodiment, using a first sample taken from the formation, a reference porosity distribution is established using a mercury injection (Hg—I) technique as is known in the art. From a second sample, a first NMR measurement is performed to obtain a transverse relaxation time constant distribution (first transverse relaxation time constant distribution). Oil in the second sample is then removed and replaced with brine. A second NMR measurement is performed on the brine-filled second sample to obtain the transverse relaxation time constant distribution (second transverse relaxation time constant distribution) for this sample.

For illustration purposes, the reference porosity distribution, the first transverse relaxation time constant distribution, and the second relaxation time constant distribution may be plotted on the same graph. The diffusive couple factor can be applied to the first and second relaxation time constant distributions to determine an amount of offset between each relaxation time constant distribution and the reference porosity distribution. From the offsets, the viscosity of the fluid in the sample may be determined.

For convenience, certain definitions are presented for use throughout the specification. The term "viscosity" relates to a property of a fluid that indicates the resistance to flow of the fluid. The term "rock" relates to a porous matrix that contains a fluid. The term "pore system" relates to the pores in the porous matrix. The term "transverse relaxation time constant" relates to the time required for a transverse magnetization vector in a material to drop to 37% of its original amplitude. The term "apparent transverse relaxation time constant" relates to the transverse relaxation time constant measured in the NMR measurements. The apparent transverse relaxation time constant reflects the rate of transverse energy loss through a spin-spin relaxation created by a perturbing radio frequency pulse that may be referred to as a "Carr-Purcell-Meiboom-Gill pulse" or "CPMG pulse." The apparent transverse relaxation time constant may include a surface component, a bulk component, and a diffusive component. The term "wetting" relates to the contact between a solid and a liquid resulting from intermolecular interactions when the solid and the liquid are brought together. The term "normalizing" relates to at least one of shifting and modifying a set of data points such that a peak of the set of data points coincides with a similar peak in a reference set of data points.

Figure 1B:
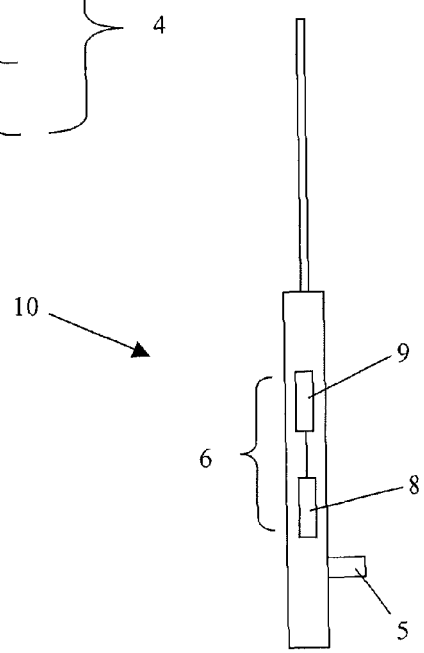

As a matter of convention, one should note that the variables used herein appear throughout the disclosure. Accordingly, previously defined variables are generally not reintroduced. For convenience of referencing, some of the following representations are applied herein, or related to the teachings herein:

$T_2$—transverse relaxation time constant
$T_{2(app)}$—apparent transverse relaxation time constant
$T_{2(s)}$—surface relaxation component for $T_{2(app)}$
$T_{2(b)}$—bulk relaxation component for $T_{2(app)}$
$T_{2(d)}$—diffusive relaxation component for $T_{2(app)}$
V—rock pore voidage volume
S—surface area of rock
ρ—relaxivity
G—magnetic field gradient
y—frequency
$T_e$—inter-echo time between radio frequency pulses
$D_j$—diffusive couple reference factor
$D_{jw}$—diffusive couple reference factor for water (or brine)
$D_{jo}$—diffusive couple factor for oil
$T_k$—temperature in degrees Kelvin
√—viscosity in centpoise
$C_k$—pressure dependent proportionality constant
$S_{wb}$—bulk water (or brine) saturation in pore system of rock
$S_{ob}$—bulk oil saturation in pore system of rock
cp—viscosity unit in centipoise
degF—temperature unit in degrees Fahrenheit Referring to FIG. 1A, an embodiment of a downhole tool 10 is shown disposed in a borehole 2. The borehole 2 is drilled through earth 7 and penetrates formations 4, which include various formation layers 4A-4C. The formations 4 can be rock that includes a porous matrix filled with a formation fluid. In one embodiment, the downhole tool 10 can retrieve a sample 3 of the formations 4 from the borehole 2 and take the sample to the surface of the earth 7 for analysis. In the embodiment of FIG. 1A, the downhole tool 10 includes a rotary core boring sample tool 5. In another embodiment (FIG. 1B), the downhole tool 10 can include the sample tool 5 and an analysis tool 6 to perform the analysis in the borehole 2. The analysis tool 6 can include an NMR instrument 8 for performing the NMR measurements and an electronics unit 9 for processing the NMR measurements. Estimating the viscosity, recording the viscosity and displaying the viscosity to a user are examples of processing the NMR measurements.

For the purposes of this discussion, the borehole 2 is depicted in FIG. 1A as vertical and the formations 4 are depicted as horizontal. The apparatus and method however can be applied equally well in deviated or horizontal wells or with the formation layers 4A-4C at any arbitrary angle.

The apparent transverse relaxation time constant may be expressed mathematically as shown in equations (1), (2), and (3).

$$\frac{1}{T_{2(app)}} = \frac{1}{T_{2(s)}} + \frac{1}{T_{2(b)}} + \frac{1}{T_{2(d)}} \tag{1}$$

$$T_{2(s)} = \frac{V}{S} * \rho \tag{2}$$

$$T_{2(d)} = \frac{(G*y*T_e)^2}{12} \tag{3}$$

An underlying assumption for the relation shown in equation (1) is that the measured apparent transverse relaxation time constant is the vectorial sum of individual component contributions. Pore aggregates of a $T_{2(app)}$ signal contribution are assumed to be representative of a single decay exponential. It is also assumed that the contributing components decay independently of each other, so that an observed decay curve is analyzed as a sum of the exponential components.

The last term of equation (1) (referred to as the "diffusive term") that includes the diffusive relaxation component $T_{2(d)}$ has been used extensively in high gradient NMR tools by varying the magnetic field gradient G and inter-echo time $T_e$ parameters to evaluate diffusive effects. However, in a zero magnetic field gradient environment, the diffusive term will be eliminated in equation (1).

The middle term of equation (1) (referred to as the "bulk term") that includes the bulk relaxation component $T_{2(b)}$ is generally assumed to be negligibly small. However, this term has a diffusive couple effect, as fluids, in general, have intramolecular forces that characterize their relative diffusivity. This diffusive couple effect is quantified by the diffusive couple term introduced above.

Figure 2:
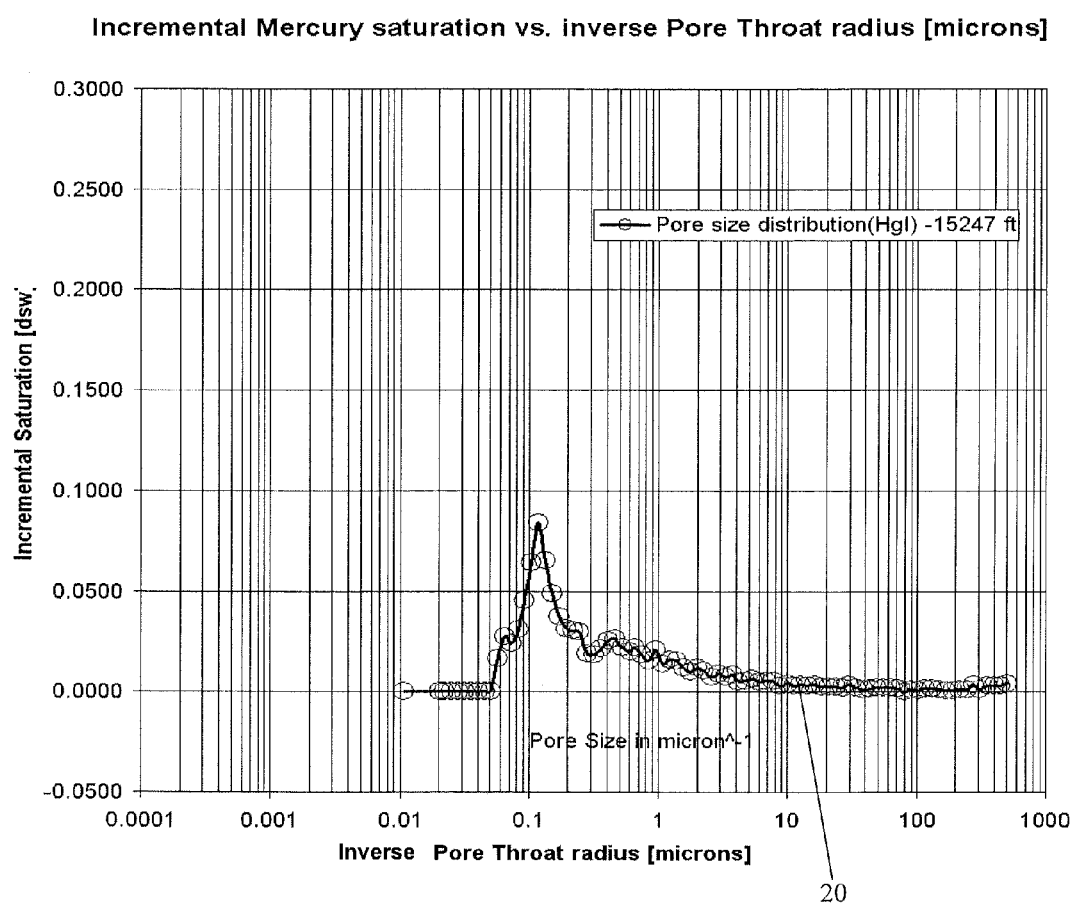
FIG. 2 is a graph of incremental mercury saturation versus inverse pore throat radius for a non-diffusive reference.

A diffusive couple reference $D_j$ is defined for a reference porosity distribution that is determined from the mercury injection technique. The reference porosity distribution for a rock pore system determined with the mercury injection technique provides a non-diffusive reference and, therefore, is defined as one ($D_j=1$). FIG. 2 illustrates an example of a graph 20 of incremental mercury saturation versus inverse pore throat radius for the reference porosity distribution.

Figure 3:
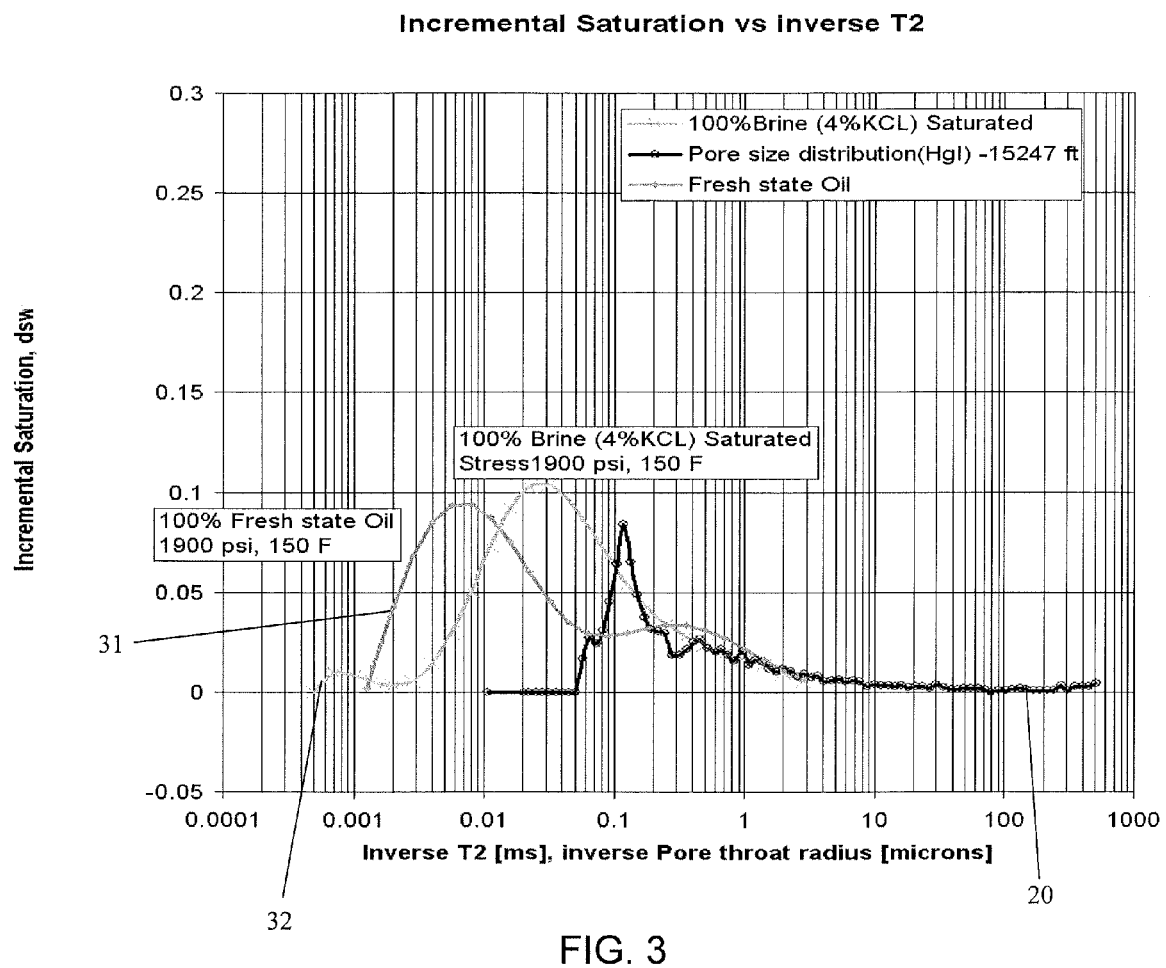
FIG. 3 is a graph of incremental saturation versus inverse T2 and inverse pore throat radius.

FIG. 3 illustrates examples of graphs of incremental saturation versus inverse apparent transverse relaxation time constant ($1/T_{2(app)}$) for rock pores that are oil-filled (graph 31) and for the rock pores that are brine-filled (graph 32). FIG. 3 also includes the plot of graph 20 where $(1/T_{2(app)})=(1$ msec.$^{-1}$) is equivalent to (1/pore throat radius)=(1 micron$^{-1}$).

Dependence of the transverse relaxation time constant on the pressure and the temperature of a sample have been established. Equation (4) relates sample temperature and viscosity to the transverse relaxation time constant (see Vinegar et al., "Hydrocarbon Saturation and Viscosity Estimation from NMR Logging in the Belridge Diatomite," Society of Petrophysicists and Well Logging Analysts 35$^{th}$ Annual Logging Symposium, Jun. 19-22, 1994).

$$T_2 = (4*T_k)/\sqrt{} \tag{4}$$

Equation (5) relates sample temperature, pressure, and viscosity to the transverse relaxation time constant (see Winkler et al., "The Limits of Fluid Property Correlations Used In NMR Well Logging," Society of Petrophysicists and Well Logging Analysts 45th Annual Logging Symposium, Jun. 6-9, 2004).

$$T_2 = (C_1 * T_k)/\sqrt{v} \quad (5)$$

Holding the sample pressure and temperature constant shows that the transverse relaxation time constant is inversely proportional to the viscosity of the sample.

A diffusive couple factor $D_{jw}$ is introduced for water or brine-filled rock pores. Mathematically, $D_{jw}$ can be expressed as shown in equation (6) where "∝" represents proportionality.

$$(1/T_{2(app)})^{Djw} \propto \sqrt{v_w} S_{wb} \quad (6)$$

Similarly, a diffusive couple factor $D_{jo}$ is introduced for oil-filled rock pores. Mathematically, $D_{jo}$ can be expressed as shown in equation (7).

$$(1/T_{2(app)})^{Djo} \propto \sqrt{v_o} S_{ob} \quad (7)$$

Using equations (6) and (7), equation (8) is established to estimate the viscosity of oil $\sqrt{v_o}$.

$$(\sqrt{v_o} * S_o)/(\sqrt{v_w} * S_w) = D_{jw}/D_{jo} \quad (8)$$

$S_{wb}$ and $S_{wo}$ are bulk saturation components and are equal ($S_{wb} = S_{wo}$) at full saturation. Equation (8) can, therefore, be simplified to provide equation (9).

$$\sqrt{v_o}/\sqrt{v_w} = D_{jw}/D_{jo} \quad (9)$$

By knowing the viscosity of the brine in the sample 3 and the diffusive couple factors for the brine and the oil in the sample 3, the viscosity of oil in the sample 3 can be calculated as shown in equation (10).

$$\sqrt{v_o} = (D_{jw}/D_{jo}) * \sqrt{v_w} \quad (10)$$

Figure 4:
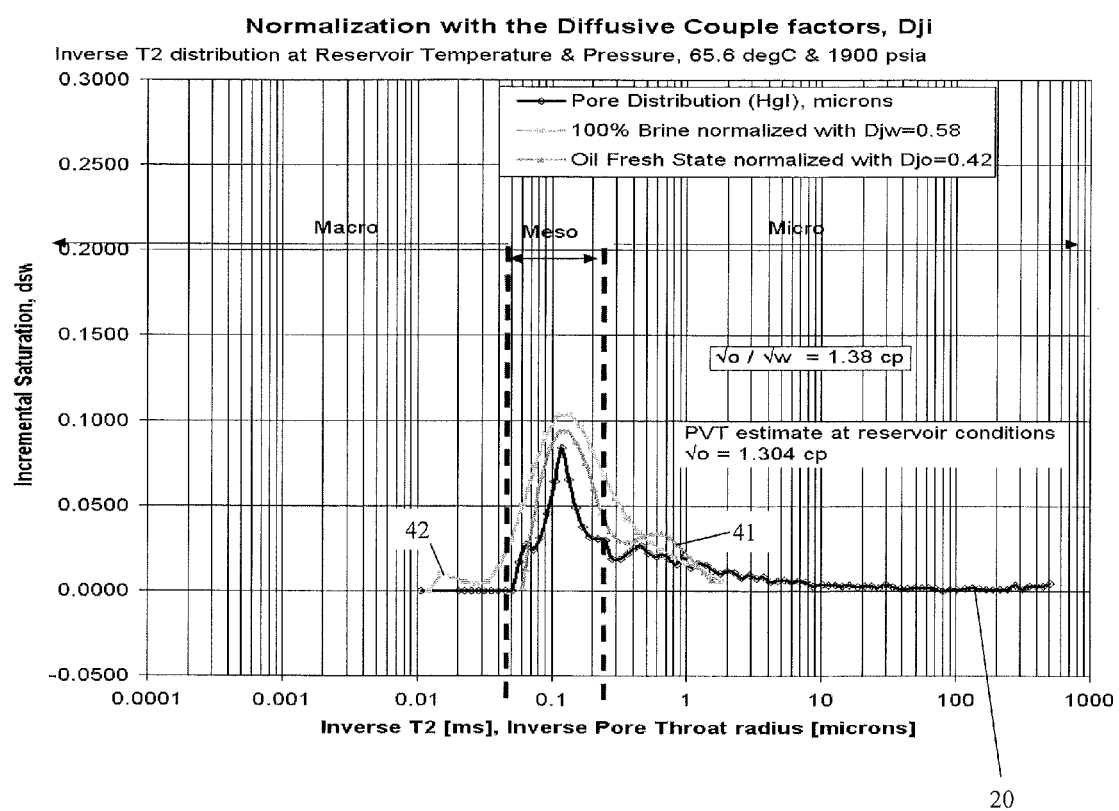
FIG. 4 illustrates an example that depicts aspects of normalizing graphs of incremental saturation using diffusive couple factors.

A method for determining the diffusive couple factors is now presented. Referring to FIG. 3, a value for the diffusive couple factor for brine $D_{jw}$ is selected to normalize graph 31 with respect to graph 20. Similarly, a value for the diffusive couple factor for oil $D_{jo}$ is selected to normalize graph 32 with respect to graph 20. FIG. 4 presents the normalized graphs. Referring to FIG. 4, a normalized graph 41 results from normalizing graph 31 with a diffusive couple factor for brine of 0.58 ($D_{jw}$=0.58). Similarly, referring to FIG. 4, a normalized graph 42 results from normalizing graph 32 with a diffusive couple factor for oil of 0.42 ($D_{jo}$=0.42). The NMR measurements for the brine and oil in FIGS. 3 and 4 were obtained at a pressure of 1900 pounds per square inch (psi) and a temperature of 65.6° C. The laboratory estimate for the viscosity of the oil from the same reservoir is 1.304 cp at 6000 psi and 134 degF.

The diffusive couple factor provides a measure of an amount of diffusivity in the bulk relaxation component. Because mercury is non-wetting, mercury is used to provide the non-diffusive reference against which the diffusivity is measured.

Figure 5:
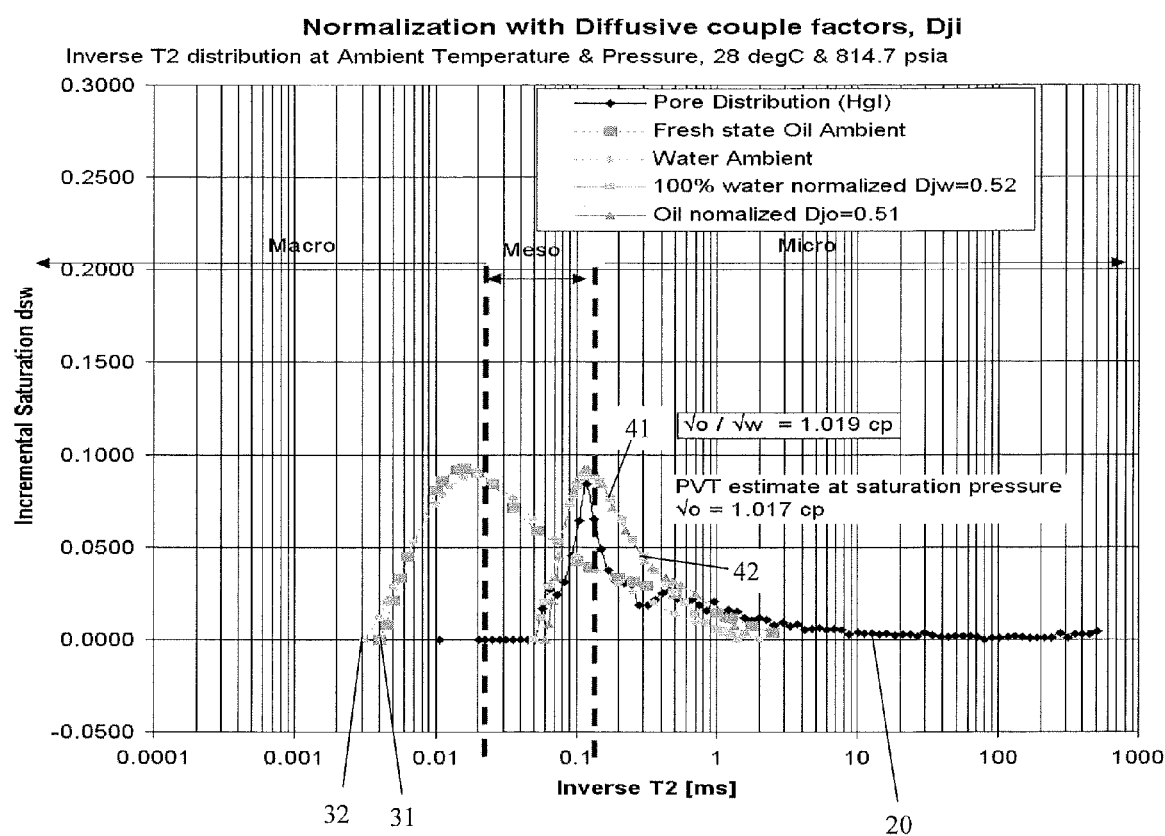
FIG. 5 illustrates another example that depicts aspects of normalizing graphs of incremental saturation using diffusive couple factors.

FIG. 5 presents another example of a plot for determining the diffusive couple factors. In this example, the NMR measurements for the brine and the oil were obtained at a pressure of 814.7 psi and a temperature of 28° C. $D_{jw}$ was determined to be 0.52 and $D_{jo}$ was determined to be 0.51.

Figure 6:
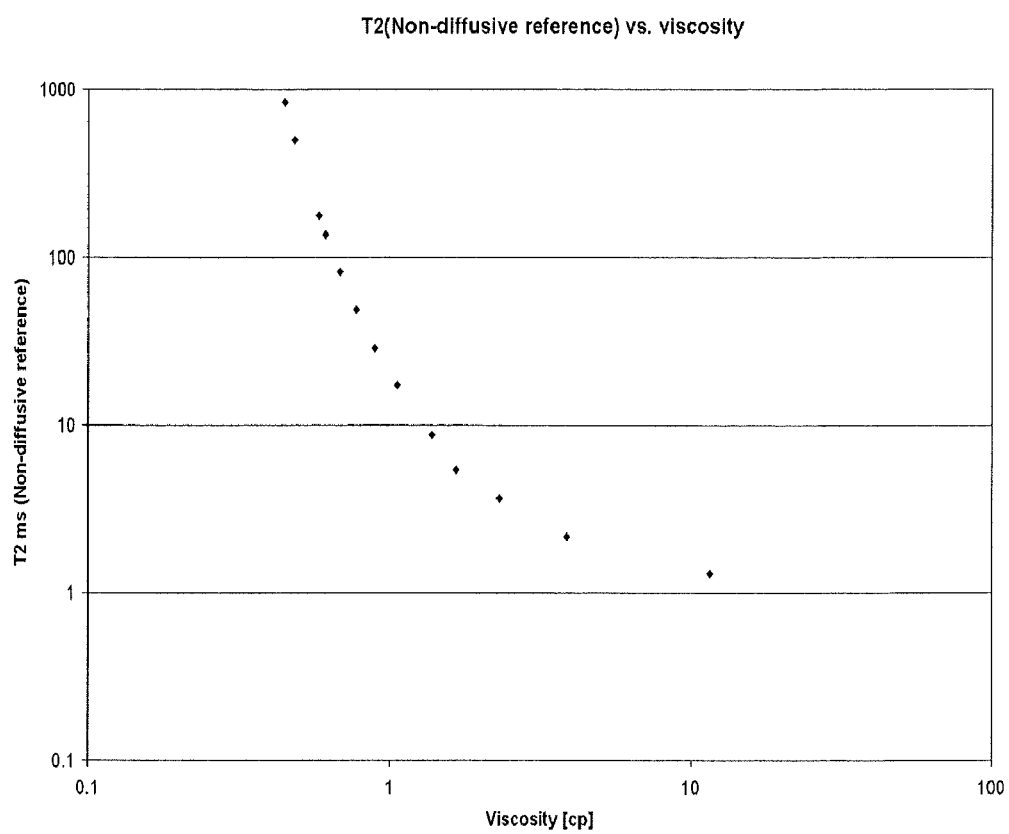
FIG. 6 presents a graph of transverse relaxation time constant versus viscosity for the non-diffusive reference.

FIG. 6 presents a graph of transverse relaxation time constant versus viscosity for the non-diffusive reference. Vinegar et al. (referenced above) determine for a particular oil field that the logarithmic mean of the transverse relaxation time constant $T_{2, log}$ can be approximated by equation (11) where $T_{2, log}$ is expressed in msec. and $\sqrt{v}$ is expressed in cp.

$$T_{2, log} = 1200/(\sqrt{v})^{0.9} \quad (11)$$

Figure 7A:
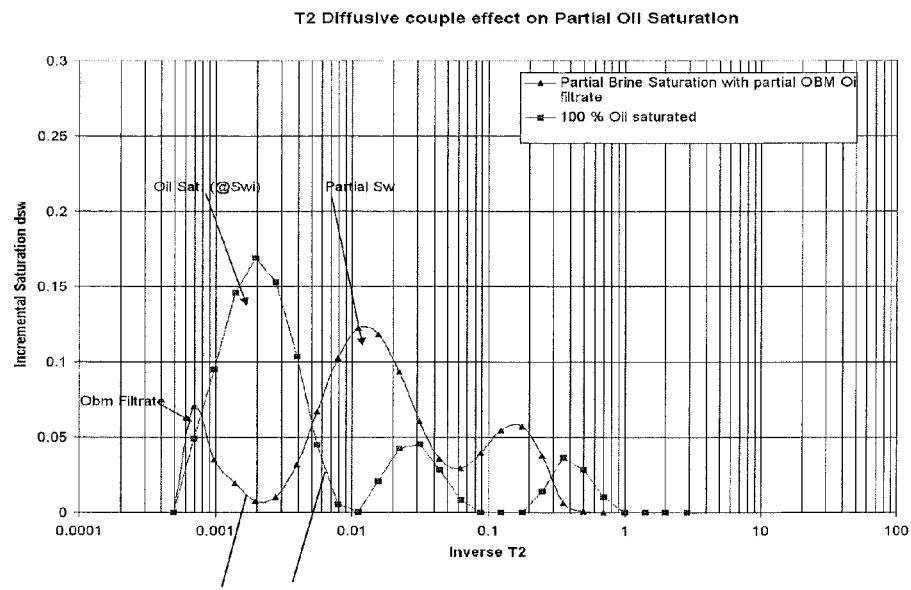
FIGS. 7A and 7B, collectively referred to as FIG. 7, illustrate aspects of an effect on a transverse relaxation time constant distribution due to partial oil saturation.
Figure 7B:
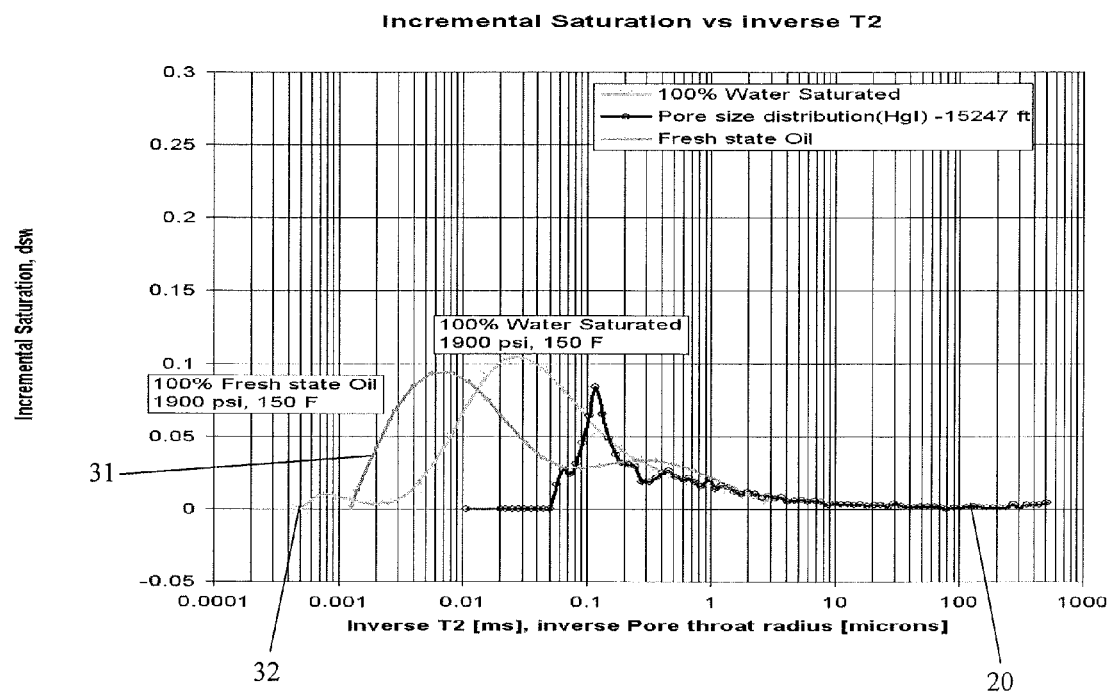

FIG. 7 illustrates aspects of an effect on the transverse relaxation time constant distribution due to partial oil saturation. FIG. 7A presents a graph of incremental saturation versus inverse $T_2$ for data obtained using a NMR instrument downhole. The data is for a formation fluid that has partial brine saturation with partial oil-based mud filtrate. FIG. 7B, for comparison purposes, presents a graph of incremental saturation versus inverse $T_2$ for data obtained with an NMR instrument in a laboratory. The data from the laboratory measurements is for fully saturated water and oil. Smaller fractional oil saturation will experience lower net intermolecular forces (i.e., van der waals forces), and will exhibit a more apparent diffusive couple effect on the $T_2$ data.

Referring to FIG. 4, a normalized pore size distribution can also be determined for wetting and non-wetting fluids by applying the appropriate diffusive couple factor to normalize the incremental saturation versus the inverse $T_2$ to the non-diffusive pore distribution reference. A correction factor may be applied to account for a reduction in effective pore diameters due to the additional interfacial tension forces in liquid-liquid interfaces (wetting/non-wetting phase combinations).

Figure 8:
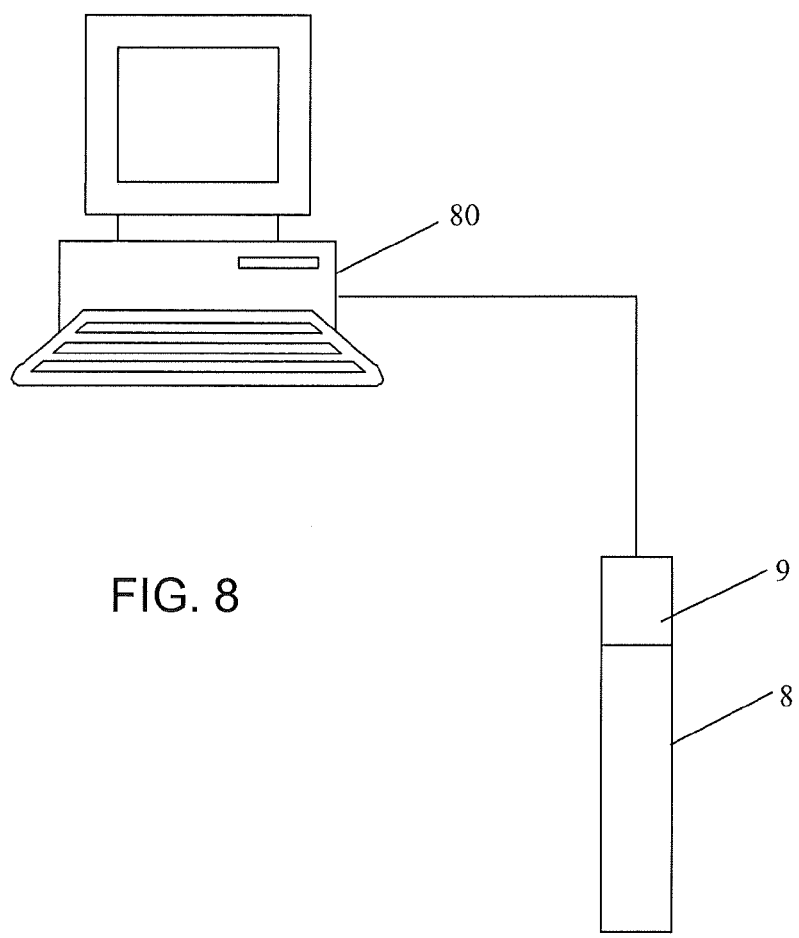
FIG. 8 illustrates a processing system coupled to a nuclear magnetic resonance instrument.

Referring to FIG. 8, an apparatus for implementing the teachings herein is depicted. In FIG. 8, the apparatus includes a computer 80 coupled to at least one of the NMR instrument 8 and the electronics unit 9. Exemplary components include, without limitation, at least one processor, storage, memory, input devices, output devices and the like. As these components are known to those skilled in the art, these are not depicted in any detail herein. The computer 80 may be disposed at least one of at the surface of the earth 7 and in the downhole tool 10. The computer 80 may also be incorporated into the electronics unit 9.

Generally, some of the teachings herein are reduced to an algorithm that is stored on machine-readable media. The algorithm is implemented by the computer 80 and provides operators with desired output.

Figure 9:
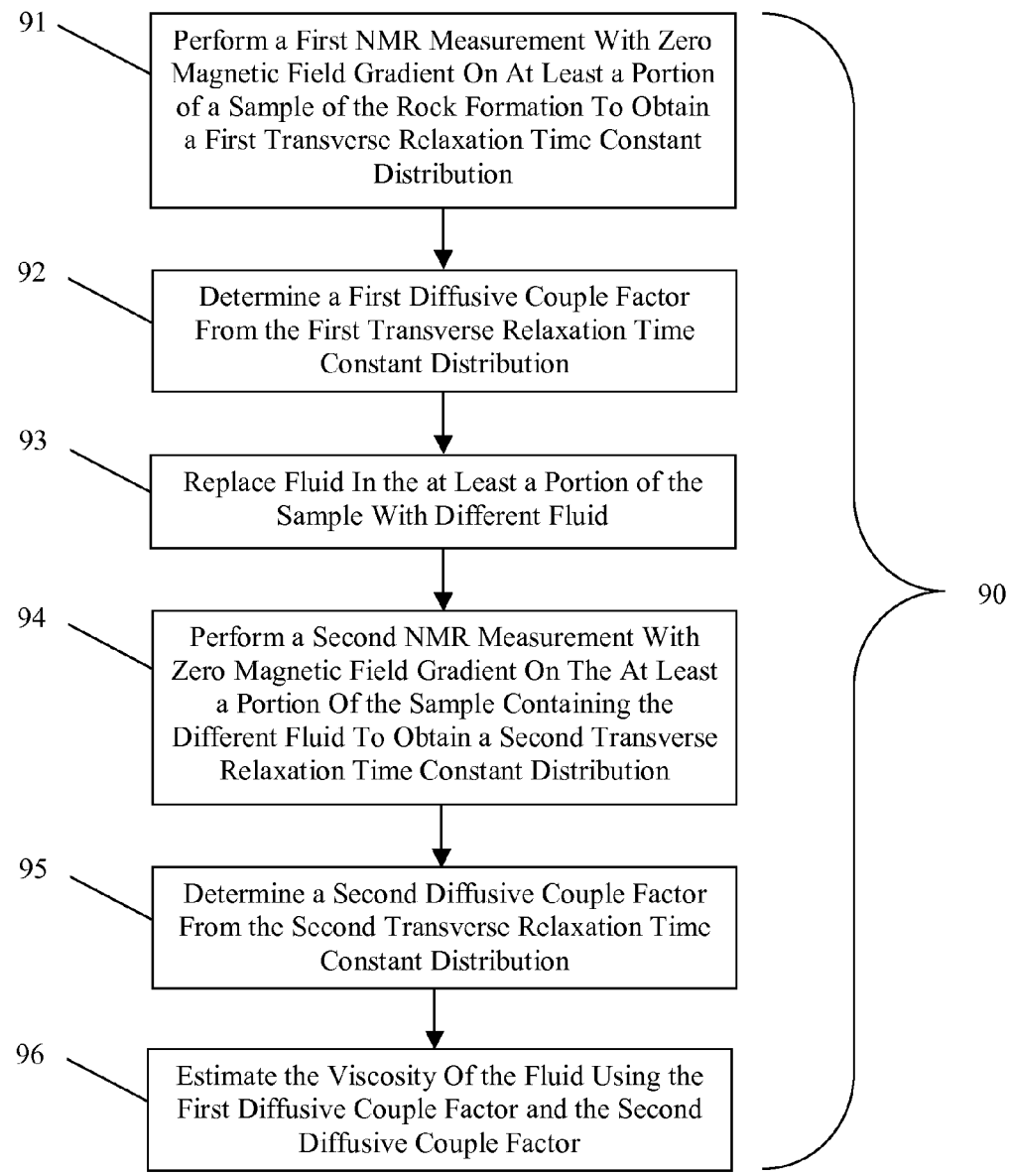
FIG. 9 presents an example of a method for estimating viscosity of a fluid.

FIG. 9 presents one example of a method 90 for estimating a viscosity of a fluid in a rock formation. The method 90 calls for (step 91) performing a first NMR measurement with zero magnetic field gradient on at least a portion of a sample of the rock formation to obtain a first transverse relaxation time constant distribution. Further, the method 90 calls for (step 92) determining a first diffusive couple factor from the first transverse relaxation time constant distribution. Further, the method 90 calls for (step 93) replacing the fluid of the at least a portion of the sample with another fluid. Further, the method 90 calls for (step 94) performing a second NMR measurement with zero magnetic field gradient on the at least a portion of the sample containing the another fluid to obtain a second transverse relaxation time constant distribution. Further, the method 90 calls for (step 95) determining a second diffusive couple factor from the second transverse relaxation time constant distribution. Further, the method 90 calls for (step 96) estimating the viscosity of the fluid using the first diffusive couple factor and the second diffusive couple factor.

In support of the teachings herein, various analysis components may be used, including digital and/or analog systems. The digital and/or analog systems may be included in the electronic unit 9 for example. The system may have components such as a processor, analog to digital converter, digital to analog converter, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing for aspects of the teachings herein. For example, a power supply (e.g., at least one of a generator, a remote supply and a battery), a sample coring unit, a sample storage unit, cooling component, heating component, motive force (such as a translational force, propulsional force, a rotational force, or an acoustical force), digital signal processor, analog signal processor, sensor, transmitter, receiver, transceiver, controller, optical unit, electrical unit or electromechanical unit may be included in support of the various aspects discussed herein or in support of other functions beyond this disclosure.

Elements of the embodiments have been introduced with either the articles "a" or "an." The articles are intended to mean that there are one or more of the elements. The terms "including" and "having" are intended to be inclusive such that there may be additional elements other than the elements listed.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for estimating a viscosity of a fluid in a rock formation, the method comprising:
    performing a first nuclear magnetic resonance (NMR) measurement with zero magnetic field gradient on at least a portion of a sample of the rock formation containing the fluid in order to obtain a first distribution of transverse relaxation time constants;
    estimating a first diffusive couple factor from the first distribution of transverse relaxation time constants, the first diffusive couple factor relating the first distribution of transverse time constants to the viscosity of the fluid and a saturation of the fluid;
    replacing the fluid on which the first NMR measurement was performed with a different fluid;
    performing a second NMR measurement with zero magnetic field gradient on the at least a portion of the sample containing the different fluid in order to obtain a second distribution of transverse relaxation time constants;
    estimating a second diffusive couple factor from the second distribution of transverse relaxation time constants, the second diffusive couple factor relating the second distribution to a viscosity of the different fluid and a saturation of the different fluid; and
    estimating the viscosity of the fluid in the rock formation by using the first diffusive couple factor and the second diffusive couple factor.

2. The method of claim 1, further comprising establishing a non-diffusive porosity distribution reference with at least another portion of the sample of the rock formation containing the fluid.

3. The method of claim 2, wherein establishing comprises using a mercury injection technique.

4. The method of claim 2, wherein estimating a first diffusive couple factor comprises normalizing the first transverse relaxation time constant distribution with respect to the non-diffusive porosity distribution reference.

5. The method of claim 2, wherein estimating a second diffusive couple factor comprises normalizing the second transverse relaxation time constant distribution with respect to the non-diffusive porosity distribution reference.

6. The method of claim 2, wherein one sample of the rock formation is used for establishing the non-diffusive reference and another sample of the rock formation is used for the first and second NMR measurements.

7. The method of claim 2, further comprising determining a pore size distribution for the at least a portion of the sample by applying the first diffusive couple factor to normalize the first transverse relaxation time constant distribution to the non-diffusive porosity distribution.

8. The method of claim 7, further comprising using a correction factor to account for a reduction in effective pore diameters due to additional interfacial tension forces in interfaces between fluids with different wetting characteristics.

9. The method of claim 1, wherein the first and second NMR measurements are performed with an inter-echo time $T_e$ of about 0.6 milliseconds.

10. The method of claim 1, wherein replacing comprises:
    cooling the fluid in the at least a portion of the sample;
    leaching the fluid from the at least a portion of the sample;
    drying the at least a portion of the sample; and
    vacuuming the at least a portion of the sample with the different fluid.

11. The method of claim 1, wherein the different fluid is brine.

12. The method of claim 1, wherein the second NMR measurement is performed with the at least a portion of the sample at substantially the same pressure and temperature as when the first NMR measurement was performed.

13. The method of claim 1, wherein the first diffusive couple factor comprises an exponent to which an inverse of a transverse relaxation time constant measured in the first NMR measurement is raised.

14. The method of claim 1, wherein the second diffusive couple factor comprises an exponent to which an inverse of a transverse relaxation time constant measured in the second NMR measurement is raised.

15. An apparatus configured for estimating a viscosity of a fluid in a rock formation, the apparatus comprising:
    an electronics unit configured for:
        estimating a first diffusive couple factor from a first distribution of transverse relaxation time constants obtained from at least one sample of the rock formation containing the fluid, the first diffusive couple factor relating the first distribution of transverse relaxation time constants to the viscosity of the fluid and a saturation of the fluid;

estimating a second diffusive couple factor from a second distribution of transverse relaxation time constants obtained from the at least one sample with the fluid on which the first distribution of transverse relaxation time constants was obtained replaced by a different fluid, the second diffusive couple factor relating the second distribution of transverse relaxation time constants to a viscosity of the different fluid and a saturation of the different fluid; and estimating the viscosity of the fluid in the rock formation using the first diffusive couple factor and the second diffusive couple factor;

wherein the first distribution and the second distribution are obtained using a zero magnetic field gradient.

16. The apparatus of claim 15, wherein the electronics unit is further configured for receiving a non-diffusive porosity distribution reference.

17. The apparatus of claim 15, further comprising a downhole tool configured for taking the at least one sample and an instrument configured for performing nuclear magnetic resonance (NMR) measurements (NMR) in order to provide the first distribution of transverse relaxation time constants and the second distribution of transverse relaxation time constants.

18. The apparatus of claim 15, wherein the downhole tool comprises the instrument and the electronics unit.

19. A non-transitory computer readable storage medium comprising machine executable instructions estimating a viscosity of a fluid in a rock formation, by implementing a method comprising:

estimating a first diffusive couple factor from a first distribution of transverse relaxation time constants obtained from at least one sample of the rock formation, the first distribution obtained using a zero magnetic field gradient, the first diffusive couple factor relating the first distribution of transverse relaxation time constants to the viscosity of the fluid and a saturation of the fluid;

determining a second diffusive couple factor from a second distribution of transverse relaxation time constants obtained from the at least one sample with the fluid on which the first distribution of transverse relaxation time constants was obtained replaced by a different fluid, the second distribution obtained using a zero magnetic field gradient, the second diffusive couple factor relating the second distribution of transverse relaxation time constants to a viscosity of the different fluid and a saturation of the different fluid;

estimating the viscosity of the fluid in the rock formation using the first diffusive couple factor and the second diffusive couple factor; and at least one of recording the viscosity and displaying the viscosity to a user.

* * * * *